Patented Mar. 22, 1938

2,111,708

UNITED STATES PATENT OFFICE 2,111,708

ELECTRIC RESISTANCE MATERIAL

Johannes J. A. Ploos van Amstel, Eindhoven, Netherlands, assignor to N. V. Philips' Gloeilampenfabrieken, Eindhoven, Netherlands No Drawing. Application June 11, 1935, Serial No. 26,039. In Germany August 31, 1934

1 Claim. (Cl. 201—76)

As is well known, the element silicon has a negative temperature coefficient of electric resistance.

The invention relates to electric resistances, having a negative temperature coefficient of resistance, while use is made of silicon or of substances having similar properties such as ferrosilicon.

In fact, it has been found that the value of the said negative temperature coefficient, which in the case of the element silicon amounts to about 10, may be considerably increased, for example to 100 and upwards, by sintering in an inert or reducing atmosphere a mixture of a ceramic material and of silicon, in which mixture the amount by weight of silicon is larger than that of the ceramic material.

For production of electric resistances it has been proposed to sinter such a mixture which contains boric acid but according to the invention boric acid and in general substances exerting an undesired influence on the value of the negative temperature coefficient of the resistance have to be avoided.

Furthermore it has been found that with the element silicon the resistance is in hot condition, for example at 600° C., only 10 times smaller than at room temperature with the result that the negative temperature coefficient is small, the value of the resistance being, for the rest, small both at room temperature and at the operating temperature. If silicon is mixed with an excess of ceramic material, the resistance is found to have a high value both at room temperature and at operating temperature while the negative temperature coefficient still has a fairly small value.

If, however, in accordance with the invention, use is made of a quantity by weight of the element silicon which is larger than that of the ceramic material, one obtains an electric resistance whose resistance value is large at room temperature and is small at operating temperature so that the negative temperature coefficient has a high value. As the resistance has a small value at the operating temperature, one obtains the additional advantage that the electric resistances being in the hot state of operation and connected in series with consuming apparatus give small losses.

The invention will be explained more fully with reference to one mode of realization.

30 grs. of ferrosilicon are pulverized, sieved and then mixed with 10 grs. of Hattenleidelheimer clay and 50 mgrs. of tragacanth which are both in a finely pulverulent state. Subsequently, 7 cubic centimeters of water are added and the mixture is stirred so as to form a uniform paste which is compressed into rods. After being dried in the air for a few hours, these rods are sintered in a gas which is a mixture of nitrogen with 10–30% of hydrogen for about 60 minutes at a temperature of about 1300° C. Then the rods are silvered at the ends and provided with nickel strips. The rods thus obtained have at room temperature a specific resistance of 4000 ohms and in the hot state of operation, for example at 600° C., a specific resistance of 10 ohms. These values of the specific resistance may be further reduced, for example to 2 ohms at 600° C., by raising the sintering temperature to close to the melting point of ferrosilicon, for example to 1400° C., or by lengthening the heating period.

Hattenleidelheimer clay is a commercial clay of German origin. The chemical composition of this clay is approximately as follows:

| | Percent |
|---|---|
| $SiO_2$ | 36.2 |
| $Al_2O_3$ | 38.8 |
| $Fe_2O_3$ | 2.2 |
| $TiO_2$ | 0.8 |
| $CAO$ | 0.6 |
| $Na_2O$ | 0.2 |
| $K_2O$ | 1.5 | rest loss due to burning. The use of this clay insures a uniform product having a long life. Also resistance elements made up in accordance with the invention are easily molded to any desired shape and after being sintered it is found that the units exhibit permanent toughness despite long usage as distinguished from brittle resistors now in commercial use.

I claim:

A process of making a resistance material which consists in making an intimate mixture of pulverized ferrosilicon and Hattenleidelheimer clay in approximately the proportion of 30 grains of the former to 10 grains of the latter and 50 mgrs. of tragacanth, adding thereto 7 cubic centimeters of water, stirring the resultant mixture so as to form a uniform paste, compressing the paste into forms of suitable shapes, drying the compressed paste and sintering the dried paste forms in a gas mixture composed of nitrogen and 10–30% hydrogen for about one hour at a temperature of 1300° C.

JOHANNES J. A. PLOOS v. AMSTEL.